United States Patent [19]
Nason et al.

[11] Patent Number: 6,018,332
[45] Date of Patent: Jan. 25, 2000

[54] OVERSCAN USER INTERFACE

[75] Inventors: D. David Nason, Bainbridge Island; Thomas C. O'Rourke; J. Scott Campbell, both of Seattle, all of Wash.

[73] Assignee: Ark Interface II, Inc., Seattle, Wash.

[21] Appl. No.: 08/975,268

[22] Filed: Nov. 21, 1997

[51] Int. Cl.[7] ................................................. G06F 3/14
[52] U.S. Cl. ................................ 345/127; 345/113
[58] Field of Search .............................. 345/127, 113, 345/114, 118, 121, 129, 130, 131, 132, 133, 141, 147, 148, 149, 340, 341, 342, 348, 352, 128

[56] References Cited

U.S. PATENT DOCUMENTS

| | | | |
|---|---|---|---|
| 4,476,464 | 10/1984 | Hobbs | 340/731 |
| 4,586,035 | 4/1986 | Baker et al. | 340/712 |
| 4,642,790 | 2/1987 | Minshull et al. | 364/900 |
| 4,710,761 | 12/1987 | Kapur et al. | 340/721 |
| 4,868,765 | 9/1989 | Diefendorff | 364/521 |
| 4,972,264 | 11/1990 | Bishop et al. | 348/588 |
| 5,001,697 | 3/1991 | Torres | 364/521 |
| 5,060,170 | 10/1991 | Bourgeois et al. | 364/521 |
| 5,072,412 | 12/1991 | Henderson, Jr. et al. | 395/159 |
| 5,119,082 | 6/1992 | Lumelsky et al. | 345/132 |
| 5,339,390 | 8/1994 | Robertson et al. | 395/157 |
| 5,418,572 | 5/1995 | Nonweiler et al. | 348/446 |
| 5,473,745 | 12/1995 | Berry et al. | 395/157 |
| 5,491,795 | 2/1996 | Beaudet et al. | 395/159 |
| 5,513,342 | 4/1996 | Leong et al. | 395/157 |
| 5,521,614 | 5/1996 | Kotha et al. | 345/128 |
| 5,586,244 | 12/1996 | Berry et al. | 395/340 |
| 5,621,428 | 4/1997 | King et al. | 345/118 |
| 5,625,782 | 4/1997 | Soutome et al. | 395/347 |
| 5,675,755 | 10/1997 | Trueblood | 395/346 |
| 5,745,109 | 4/1998 | Nakano et al. | 345/340 |
| 5,818,416 | 10/1998 | Hwang | 345/127 |
| 5,831,592 | 11/1998 | Cahill, III | 345/127 |
| 5,838,296 | 11/1998 | Butler et al. | 345/127 |
| 5,864,347 | 1/1999 | Inoue | 345/516 |
| 5,874,937 | 2/1999 | Kesatoshi | 345/127 |
| 5,874,965 | 2/1999 | Takai et al. | 345/357 |

FOREIGN PATENT DOCUMENTS

| | | |
|---|---|---|
| 0564174A2 | 10/1993 | European Pat. Off. . |
| WO9634467 | 10/1996 | WIPO . |

OTHER PUBLICATIONS

"Coordinating Multiple Graphical User Interfaces Video Access"; IBM Technical Disclosure Bulletin. vol. 39, No. 5, May 1996, pp. 7–9, XP000584036; New York, US.

Keith A. Lantz and Richard F. Rachid, "Virtual Terminal Management in a Multiple Process Environment", Proceedings of the Seventh Symposium on Operating Systems Principles, Association for Computing Machinery, Dec. 10–12, 1979, pp. 86–97.

Norman Meyowitz, Margaret Moser, "Bruwin: An Adaptable Design Strategy for Window Manager/Virtual Terminal Systems", Proceedings of the Eighty Symposium on Operating Systems Principles, Association for Computing Machinery, vol. 15 No. 5, Dec. 1981, pp. 180–189.

(List continued on next page.)

*Primary Examiner*—Steven Sax
*Attorney, Agent, or Firm*—Irell & Manella LLP

[57] ABSTRACT

A method for creating and accessing a graphical user interface in the overscan area outside the area of the display normally visible to users of the common operating systems. This normal display area is generally known as the "desktop". The desktop serves as the graphical user interface to the operating system. The desktop displays images representing documents and applications available to the user (icons). The desktop is restricted in the common environments to a predetermined set of resolutions (e.g., 640×480, 800×600, 1024×768) as defined by VGA and SuperVGA standards. Displayable borders outside this area are the overscan.

33 Claims, 11 Drawing Sheets

OTHER PUBLICATIONS

Stefan Stille, Shailey Minocha and Rolf Ernst, "A$^2$DL—An Adaptive Automatic Display Layout System", Third Annual Symposium on Human Interaction with Complex Systems HICS '96, IEEE Computer Society Press, pp. 243–250.

Ellis S. Cohen, Edward T. Smith, Lee A. Iverson, "Constraint–Based Tiled Windows", IEEE Computer Society Press, May 1986, pp. 35–45.

Michael Gancarz, "Uwm: A User Interface for X Windows", USENIX Association, Summer Conference Proceedings, Jun. 9–13, 1986, pp. 429–440.

Todd Brunhoff, "Pleasing the Eye", UNIX Review, vol. 7 No., 10, pp. 65–72.

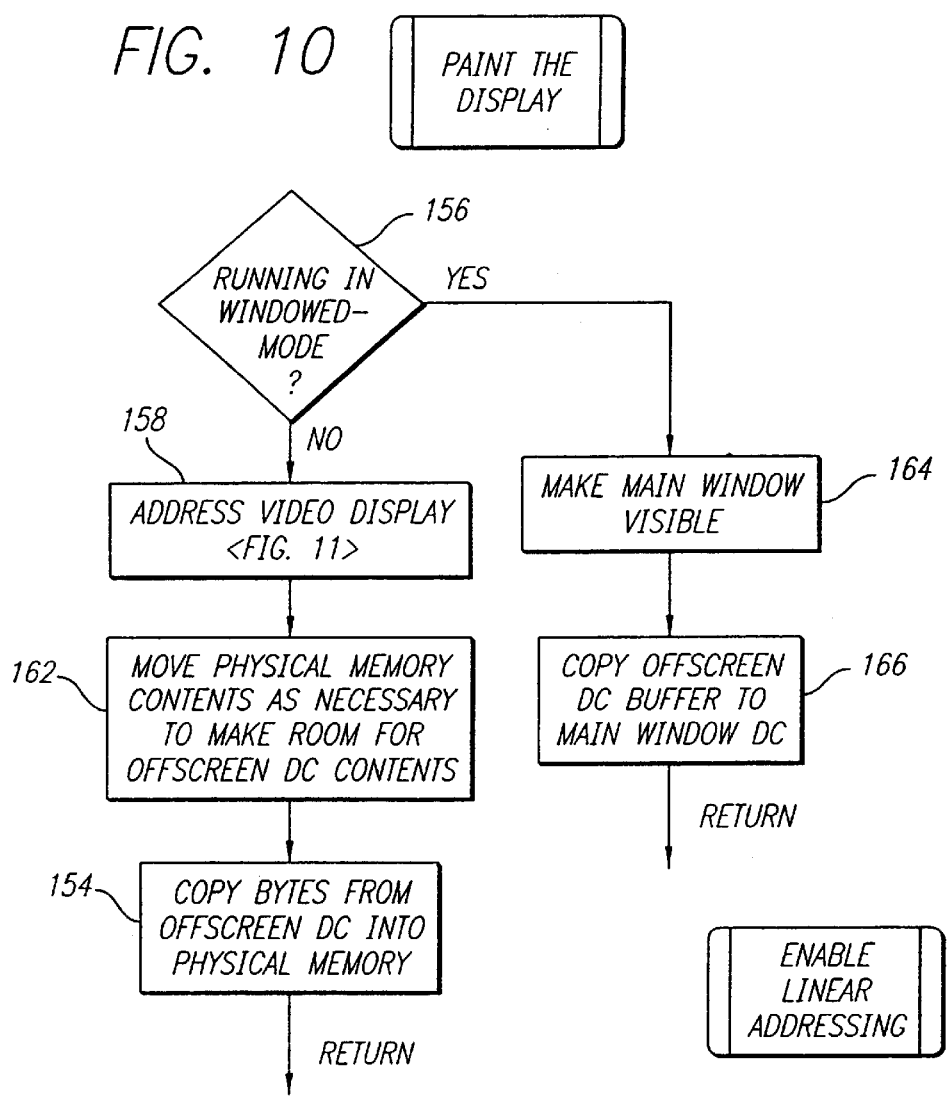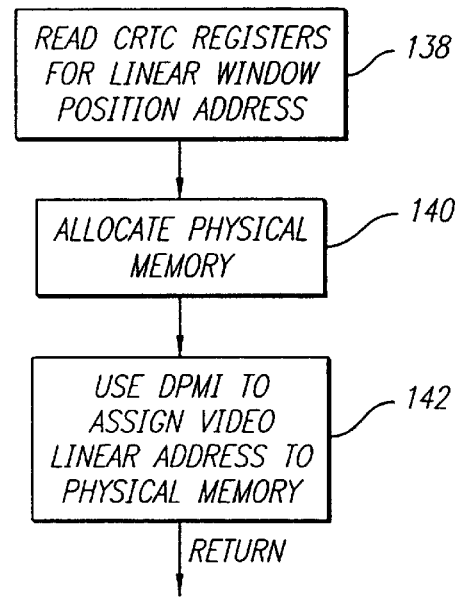

OVERSCAN USER INTERFACE

This invention relates to computer user interface displays and the use of the overscan border to present a user interface beyond the perimeter of a standard user interface display.

BACKGROUND OF THE INVENTION

There was a time when the most popular operating system for personal computers (DOS) did not include a graphical user interface. Any company could create a "menu" or "shell" which would be the first program launched upon starting the computer and which would present options to the user for launching and managing various applications. Although graphics programming was difficult in the DOS environment, some companies even created graphical user interfaces which could then launch other programs.

Microsoft Corporation of Redmond, Wash., introduced such a graphical user interface for launching applications which it called "Windows". The first three versions of Windows were merely applications which ran under DOS and could be one of numerous items to be selected from a previously running shell or menu which might be offered by a company other than Microsoft. This continued to allow other companies to offer primary user interface programs to users without the user going through a Microsoft controlled user interface.

However, with the introduction by Microsoft of Windows 95™, the initial loading of the operating system presents a Microsoft developed graphical user interface at the outset which occupies the entire screen display. Microsoft arranged with manufacturers of the standard computer hardware to include this operating system with each computer sold. With Microsoft's domination of this market, it became impossible for other software vendors to present an interface to users other than as a Microsoft style icon within the Microsoft "desktop" consisting of the entire screen display. This prompted a need for access to a user interface which could be presented outside of the standard computer screen display and therefore independent of the dictates of Microsoft for items within its "desktop".

Standard personal computers use VGA or Super VGA or XGA video display systems. These display systems operate in standardized modes such as 640×480 pixels, 800×600 pixels, 1024×768 pixels, and 1280×1024 pixels. When one of these display modes is selected, this is the entire area available for display. In the Microsoft Windows environment, the user instructs the Windows operating system to select one of these standard display modes and the Windows operating system then presents all of the applications and their icons within the selected display area. There is no way to cause the Windows "desktop" to use less than the entire display area and still function as intended and allow another program from another vendor to control the remainder.

SUMMARY OF THE INVENTION

The invention is a method for adding a user interface border beyond the standard screen display area. The VGA, SVGA and XGA video systems include a defined border surrounding the display area. The original purpose of this border was to allow adequate time for the horizontal and vertical retrace of the electron gun in a cathode ray tube display. However, as retrace speeds have increased in modern monitors, it is now possible to present a user interface display in this border. The border which can be controlled as a user interface is a portion of what is known as the "overscan". This invention is a method for presenting a user interface in the overscan.

When the electron gun in a CRT retraces to the left of the screen or the top of the screen, it requires a significant amount of time relative to the presentation of a scanned line of data. During the retrace, the electron gun is turned off ("blanked"). If the blanking time required for the retrace is equal to the amount of time available, there is no usable overscan. However, modern monitors have become much faster in their retrace speeds, leaving a significant amount of time when the electron gun need not be blanked, allowing a displayable border. In the prior art, although the border is usually "black" (the gun is turned off), it is well-known to specify that the border shall be given any one of six colors. Standard BIOS allows a specification of this color. The desired color is simply specified in one of the registers for the video controller. No data for this color is stored in the buffer of video memory for the display. This invention establishes an additional video buffer for the border and allows this buffer to be written with display data like the regular display buffer. The display area is thereby expanded, on one or more edges, to provide a visible area previously invisible. The pixels within this newly visible area of the display are made accessible to programs though an application programming interface (API) component of this invention. A program incorporating a graphical user interface may be displayed in the previously blanked area of the display, functionally increasing the accessible area of the display without hardware modification.

The invention is a method for displaying an image on a video display system in an overscan area outside of the display area generated by the video display system. The standard display area is defined by two dimensions, each specifying a number of pixels. These dimensions are specified by selecting a video "mode". The method is accomplished by adjusting parameters for the video display system to increase the number of pixels in at least one dimension of the display system. The number of pixels which is added is less than or equal to the difference between the number of pixels specified in the video mode and a maximum number of pixels which the video display system can effectively display. This difference is the overscan. Because all interface displays are created by writing a desired image to a buffer or memory for the video display, the method requires allocating additional video display memory for the increased pixels. The image written to such memory is then displayed by the system alongside the original display area.

In the preferred embodiment, only the vertical dimension is increased and the overscan user interface is presented below the standard display area. Alternatively, the horizontal dimension may be increased and the overscan user interface displayed to the right of the standard display area. Similarly, the interface image may be displayed on any or all of the four sides of the standard display area.

User input causing movement of a pointer or cursor on the display will move the cursor or pointer to the edge of the display area. The tip of the pointer will stop at the edge most pixel. A transparent window is created which includes the window of the overscan user interface and the adjoining two pixels of the display area. To allow events to be captured in the overscan area, the pointer is displayed off-set from the hotspot such that the hotspot remains within a two pixel-wide area of the standard display on the edge of the display and captured user events which occur while the hotspot is within the two pixel edge of the standard display adjoining the overscan user interface are interpreted as occurring within the overscan area.

BRIEF DESCRIPTION OF THE DRAWINGS

FIGS. 7–13 are a flowchart of the invented method.

DETAILED DESCRIPTION OF A PREFERRED EMBODIMENT

Figure 1:
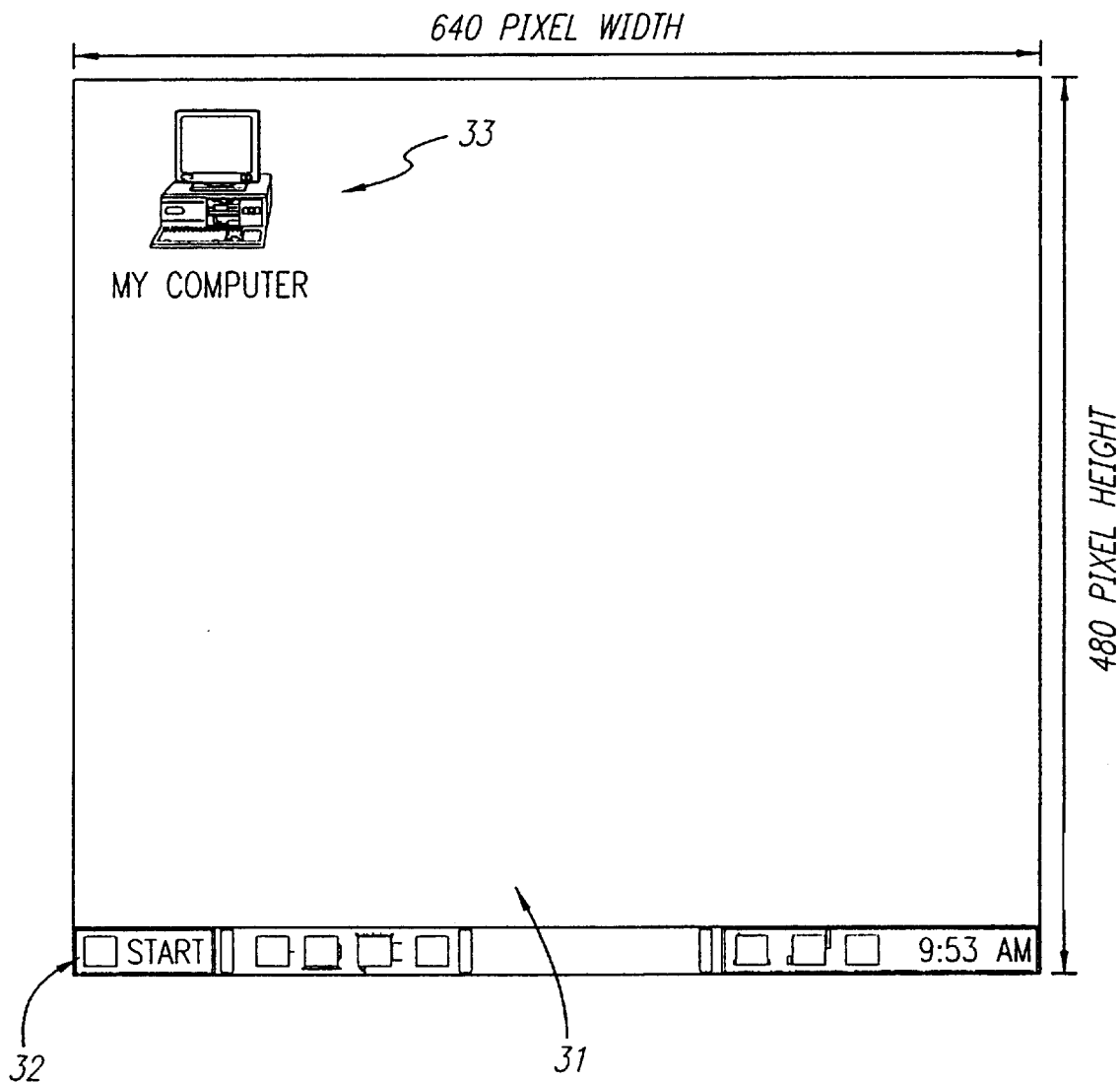
FIG. 1 shows a standard display of the prior art.
Figure 2:
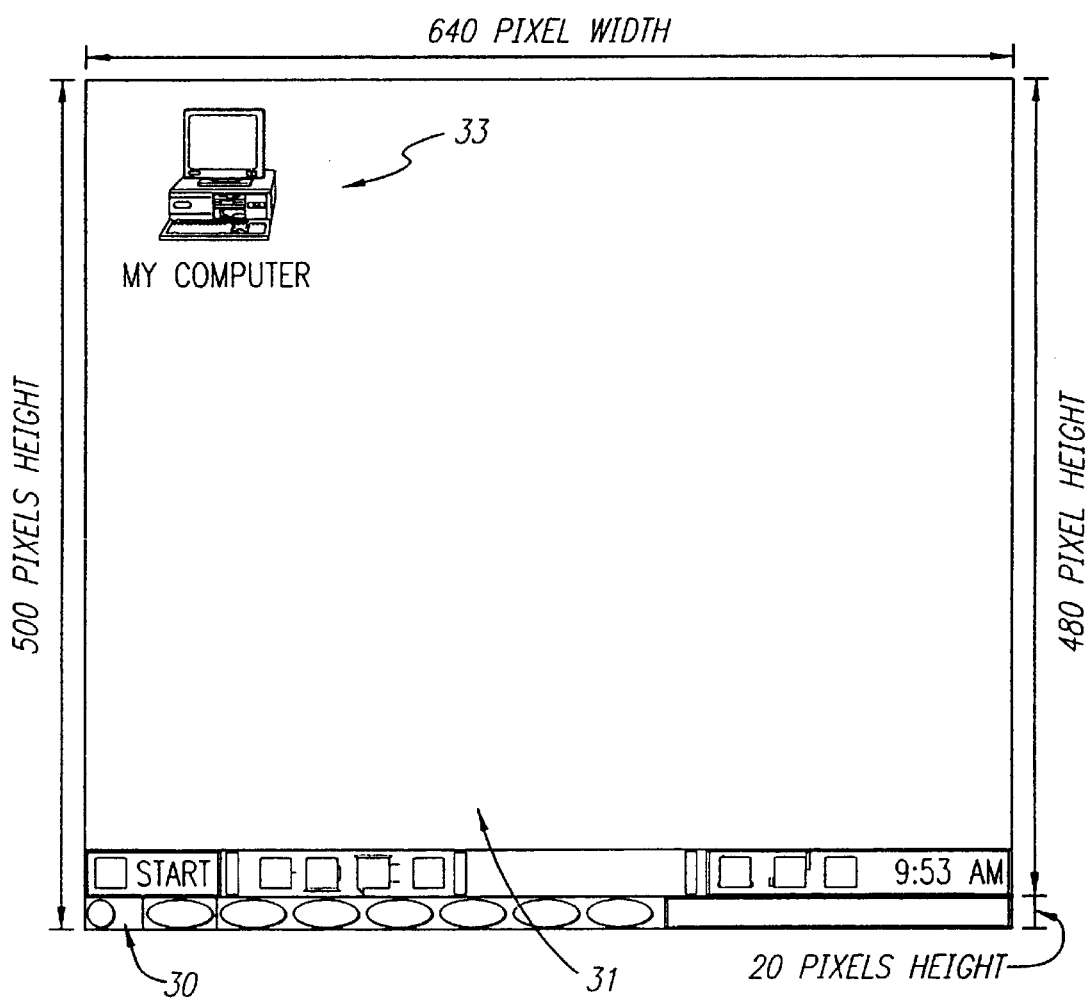
FIG. 2 shows a standard display with an overscan user interface in the bottom overscan area.
Figure 3:
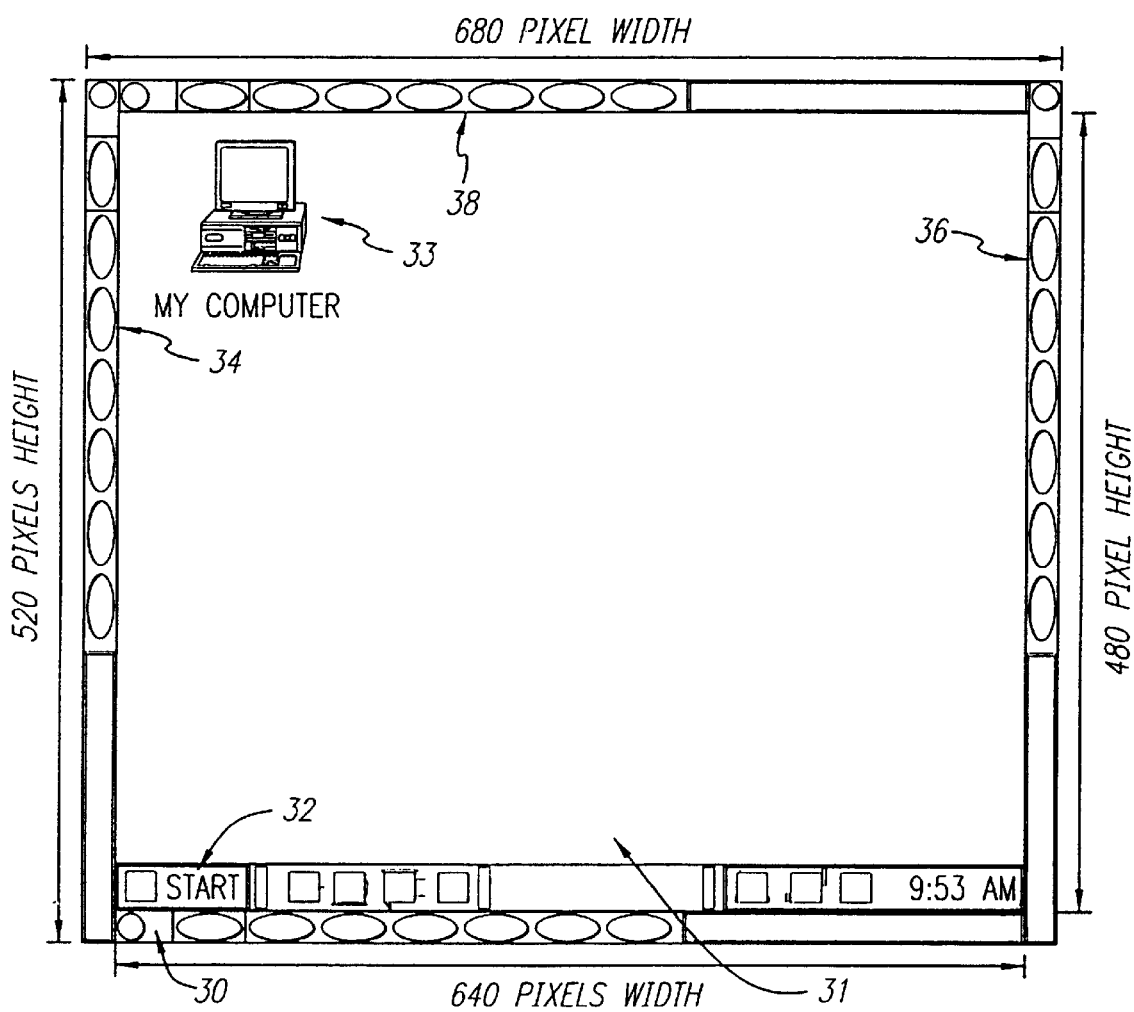
FIG. 3 shows a standard display with an overscan user interface on all four borders of the display.

Generally speaking, the present invention discloses a programming mechanism and interface in a computer system which provides access and visibility to a portion of the monitor display normally ignored and inaccessible (hereinafter "overscan area"). FIG. 1 shows a standard prior art display desktop running Microsoft Windows 95™. Within the desktop 31 are the taskbar 32 and desktop icons 33. In the preferred embodiment, a graphical user interface image is painted onto one or more of the sides of the overscan area as shown in FIGS. 2 and 3. FIGS. 2 and 3 show depictions of a SuperVGA display with the addition of a graphical bar user interface displayed in the overscan area. The overscan user interface bar 30 is defined to reside outside the borders of the "desktop" display area 31. In FIG. 2, the display is modified to include a graphical user interface 30 in a bar 20-pixels high below the bottom edge. In FIG. 3, the display is modified to include a graphical user interface in four bars each 20-pixels high/wide outside each of the four display edges: a bottom bar 30, a left side bar 34, a right side bar 36, and atop bar 38.

The overscan interface may include, and is not limited to, buttons, menus, application output controls (such as a "ticker window"), animations, and user input controls (such as edit boxes). Because the overscan interface is not obscured by other applications running within the standard desktop, the overscan interface may be constantly visible or it may toggle between visible and invisible states based upon any of a number of programming parameters (including, but not limited to, the state of the active window, the state of a toggle button, etc).

Figure 4:
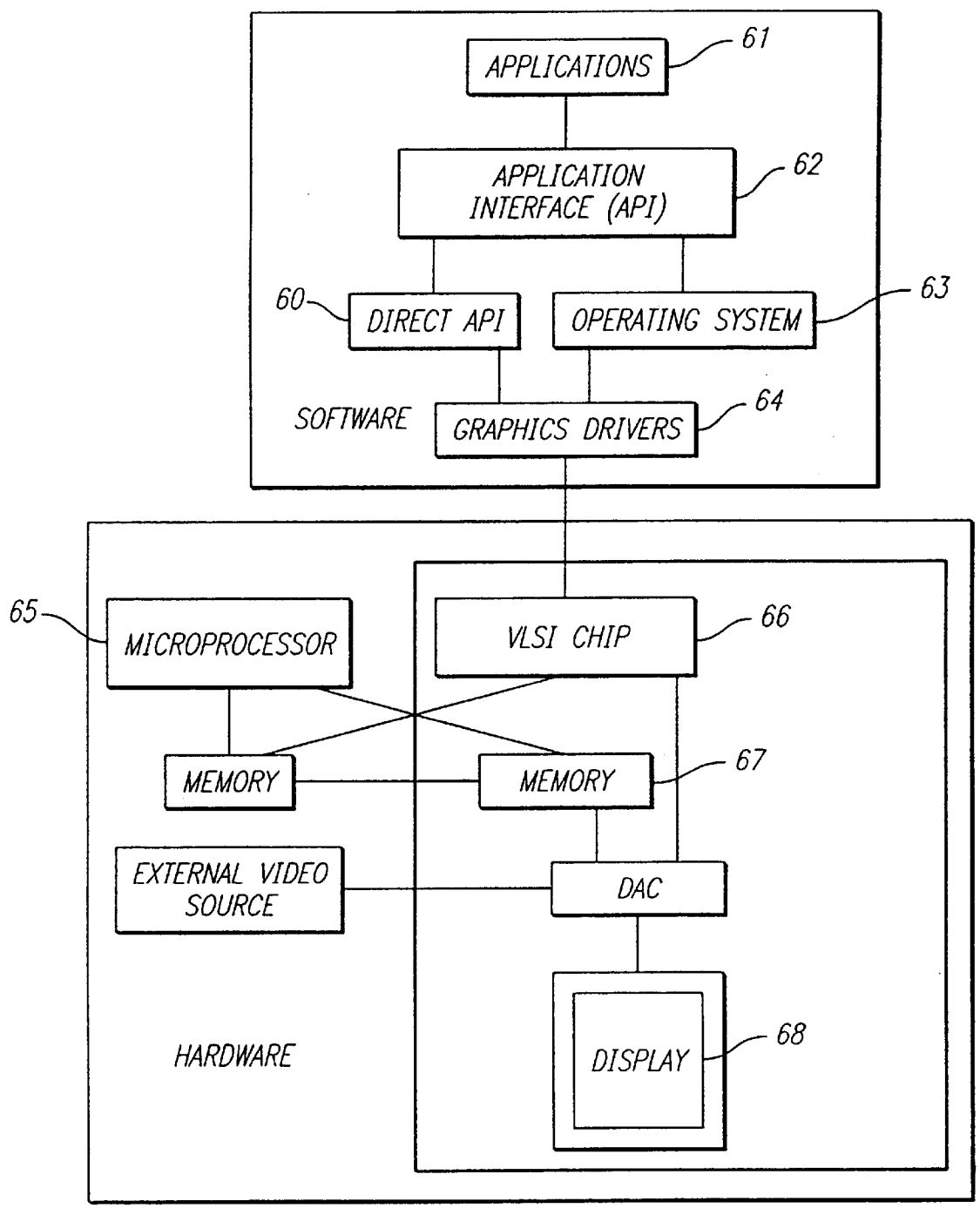
FIG. 4 shows the components of the computer system which relate to the video display system.

FIG. 4 shows the components of the computer system that relate to the video display system. Within the protected modes of modern systems, applications 61 do not have direct access to the video drivers 64 or the video chipset 66, 67, 68. Abstraction layers or APIs 60, 62 provide limited access, often through the operating system 63.

The invention provides a method of painting and accessing an area of the computer display not normally accessible in graphics modes. In the Microsoft Windows environments (including Microsoft Window 95 and derivatives, and Microsoft Windows NT 4.0 and derivatives) and other contemporary operating environments, the "desktop" display area is assigned by the operating system to be one of a set of pre-determined video "modes" laid out in Tables 1 and 2 below, each of which is predefined at a specific pixel resolution. The accessible area of the computer display may not be modified except by selecting another one of the modes.

TABLE 1

ROM BIOS video modes.

| Mode Number | Resolution | Mode Colors | Buffer Type | Segment |
|---|---|---|---|---|
| 00H | 40 × 25 chars (320 × 200 pixels) | 16 | Alpha | B800 |
| 00H | 40 × 25 chars (320 × 350 pixels) | 16 | Alpha | B800 |
| 00H | 40 × 25 chars (320 × 400 pixels) | 16 | Alpha | B800 |
| 00H | 40 × 25 chars (360 × 400 pixels) | 16 | Alpha | B800 |
| 01H | 40 × 25 chars (320 × 200 pixels) | 16 | Alpha | B800 |
| 01H | 40 × 25 chars (320 × 350 pixels) | 16 | Alpha | B800 |
| 01H | 40 × 25 chars (320 × 400 pixels) | 16 | Alpha | B800 |
| 01H | 40 × 25 chars (360 × 400 pixels) | 16 | Alpha | B800 |
| 02H | 80 × 25 chars (640 × 200 pixels) | 16 | Alpha | B800 |
| 02H | 80 × 25 chars (640 × 350 pixels) | 16 | Alpha | B800 |
| 02H | 80 × 25 chars (640 × 400 pixels) | 16 | Alpha | B800 |
| 02H | 80 × 25 chars (720 × 400 pixels) | 16 | Alpha | B800 |
| 03H | 80 × 25 chars (640 × 200 pixels) | 16 | Alpha | B800 |
| 03H | 80 × 25 chars (640 × 350 pixels) | 16 | Alpha | B800 |
| 03H | 80 × 25 chars (640 × 400 pixels) | 16 | Alpha | B800 |
| 03H | 80 × 25 chars (720 × 400 pixels) | 16 | Alpha | B800 |
| 04H | 320 × 200 pixels | 4 | Graphics | B800 |
| 05H | 320 × 200 pixels | 4 | Graphics | B800 |
| 06H | 640 × 200 pixels | 2 | Graphics | B800 |
| 07H | 80 × 25 chars (720 × 350 pixels) | 2 | Alpha | B000 |
| 07H | 80 × 25 chars (720 × 400 pixels) | 2 | Alpha | B000 |
| 0DH | 320 × 200 pixels | 16 | Graphics | A000 |
| 0EH | 640 × 200 pixels | 16 | Graphics | A000 |
| 0FH | 640 × 350 pixels | 4 | Graphics | A000 |
| 10H | 640 × 350 pixels | 4 | Graphics | A000 |
| 10H | 640 × 350 pixels | 16 | Graphics | A000 |
| 11H | 640 × 480 pixels | 2 | Graphics | A000 |
| 12H | 640 × 480 pixels | 16 | Graphics | A000 |
| 13H | 320 × 200 pixels | 256 | Graphics | A000 |

TABLE 2

SVGA video modes defined in the VESA BIOS extension

| Mode Number | Resolution | Mode Colors | Buffer Type |
|---|---|---|---|
| 100H | 640 × 480 pixels | 256 | Graphics |
| 101H | 640 × 480 pixels | 256 | Graphics |
| 102H | 800 × 600 pixels | 16 | Graphics |
| 103H | 800 × 600 pixels | 256 | Graphics |
| 104H | 1024 × 768 pixels | 16 | Graphics |
| 105H | 1024 × 768 pixels | 256 | Graphics |
| 106H | 1280 × 1024 pixels | 16 | Graphics |
| 107H | 1280 × 1024 pixels | 256 | Graphics |
| 108H | 80 × 60 chars | 16 | Alpha |
| 109H | 132 × 25 chars | 16 | Alpha |
| 10AH | 132 × 43 chars | 16 | Alpha |
| 10BH | 13 × 50 chars | 16 | Alpha |
| 10CH | 13 × 60 chars | 16 | Alpha |
| 10DH | 320 × 200 pixels | 32,768 | Graphics |
| 10EH | 320 × 200 pixels | 65,536 | Graphics |
| 10FH | 320 × 200 pixels | 16,777,216 | Graphics |
| 110H | 640 × 480 pixels | 32,768 | Graphics |
| 111H | 640 × 480 pixels | 65,536 | Graphics |
| 112H | 640 × 480 pixels | 16,777,216 | Graphics |
| 113H | 800 × 600 pixels | 32,768 | Graphics |
| 114H | 800 × 600 pixels | 65,536 | Graphics |
| 115H | 800 × 600 pixels | 16,777,216 | Graphics |
| 116H | 1024 × 768 pixels | 32,768 | Graphics |
| 117H | 1024 × 768 pixels | 65,536 | Graphics |
| 118H | 1024 × 768 pixels | 16,777,216 | Graphics |

TABLE 2-continued

SVGA video modes defined in the VESA BIOS extension

| Mode Number | Resolution | Mode Colors | Buffer Type |
|---|---|---|---|
| 119H | 1280 × 1024 pixels | 32,768 | Graphics |
| 11AH | 1280 × 1024 pixels | 65,536 | Graphics |
| 11BH | 1280 × 1024 pixels | 16,777,216 | Graphics |

Figure 6:
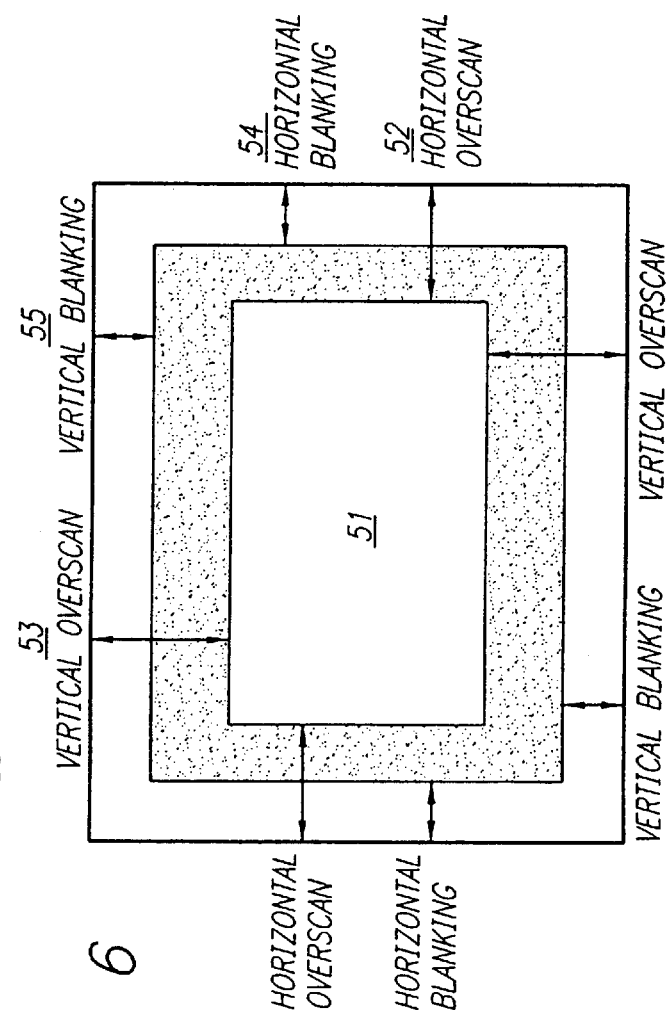
FIG. 6 shows the usable border within the vertical overscan and the horizontal overscan surrounding the standard display.

As shown in FIG. 6, a displayed image is "overscanned". That is, the displayed video buffer data occupies less than the entire drivable screen size. The width of the usable overscan border depends on the amount of the horizontal overscan 52 reduced by the horizontal blanking 54 and the amount of the vertical overscan 53 reduced by the vertical blanking 55.

For the preferred embodiment, only a border at the bottom of the standard display area is used. Consequently, only the vertical control parameters for the cathode ray tube (CRT) controller (CRTC) need to be adjusted. These parameters are shown in Table 3 below:

TABLE 3

Vertical timing parameters for CRTC programming.

| Register | Name | Description |
|---|---|---|
| 06H | Vertical Total | Value = (total number of scan lines per frame) - 2. The high-order bits of this value are stored in the overflow registers. |
| 07H | Overflow | High-order bits from other CRTC registers. |
| 10H | Vertical Retrace Start | Scan line at which vertical retrace starts. The high-order bits of this value are stored in the overflow registers. |
| 11H | Vertical Retrace End | Only the low-order 4 bits of the actual Vertical Retrace End value are stored. (Bit 7 is set to 1 to write-protect registors 0 through 7.) |
| 12H | Vertical Display End | Scan line at which display on the screen ends. The high-order bits of this value are stored in the overflow registers. |
| 15H | Start Vertical Blank | Scan line at which vertical blanking starts. The high-order bits of this value are stored in the overflow registers. |
| 16H | End Vertical Blank | Scan line at which vertical blanking ends. The high-order bits of this value are stored in the overflow registers. |
| 59H–5AH | Linear Address Window Position | Linear address window position in 32-bit CPU address space. |

In the standard 640×480 graphics mode, the nominal horizontal scan rate is 31.5 KHz (31,500 times per second) with a vertical scan rate of 60 Hz (60 frames per second). So the number of lines in one frame is 31,500/60, or 525. Because only 480 lines of data need to be displayed, there are 525–480, or 45, lines available for vertical overscan. Leaving more than adequate margin for retrace, which requires only 2 lines worth of time, the preferred embodiment uses 20 lines for the invented overscan display.

The invention is accomplished by achieving three requirements:

(1) to address and modify the visible resolution of the video display system such that portions of the overscan area are visible as shown in FIG. 6, (2) to address and modify the video display memory contents for the visible portion of the overscan area, painting as to a portion of the standard desktop display area, and (3) to provide an application programming interface (API) to allow applications to implement this functionality.

Figure 7:
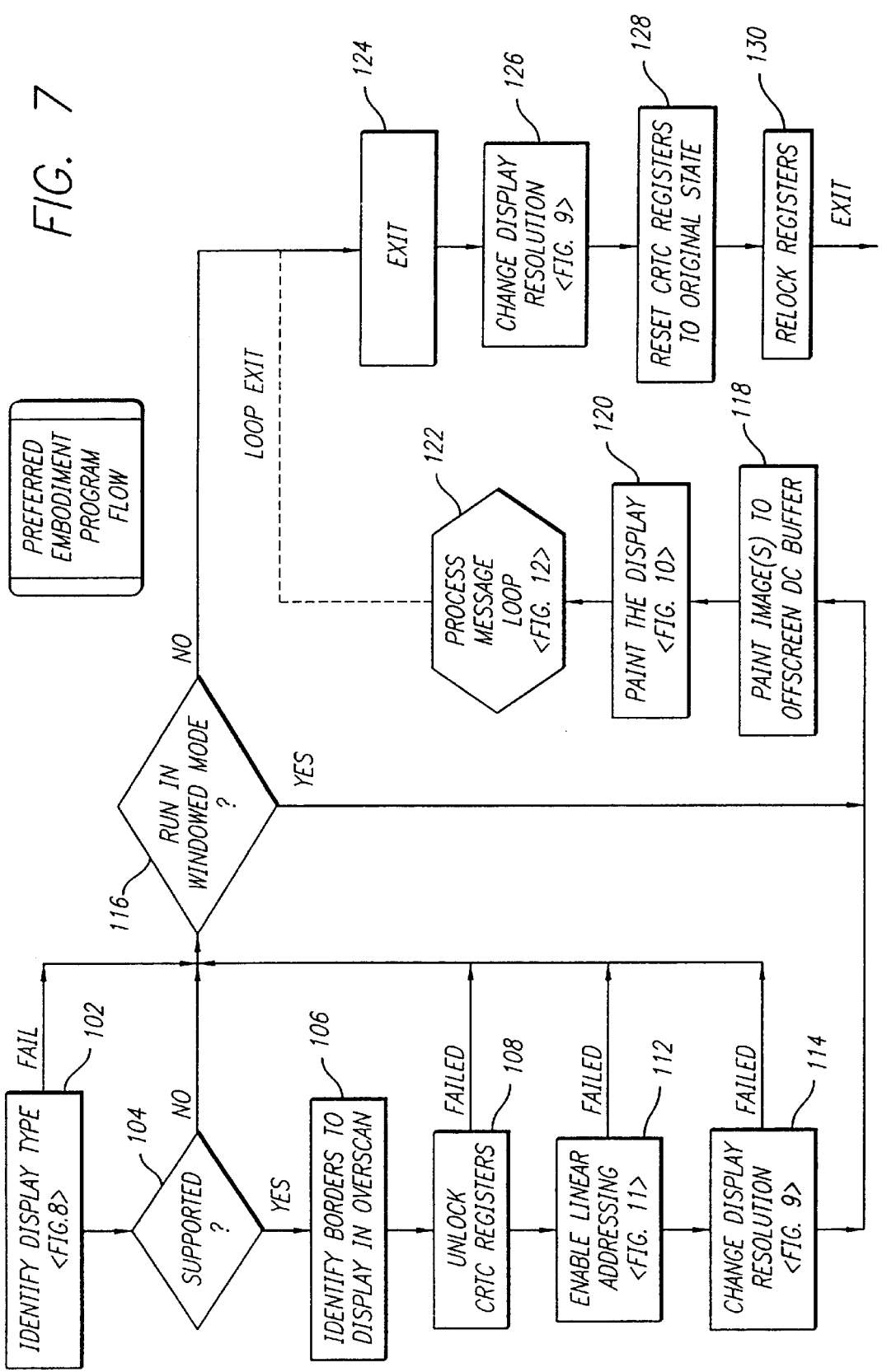
Figure 8:
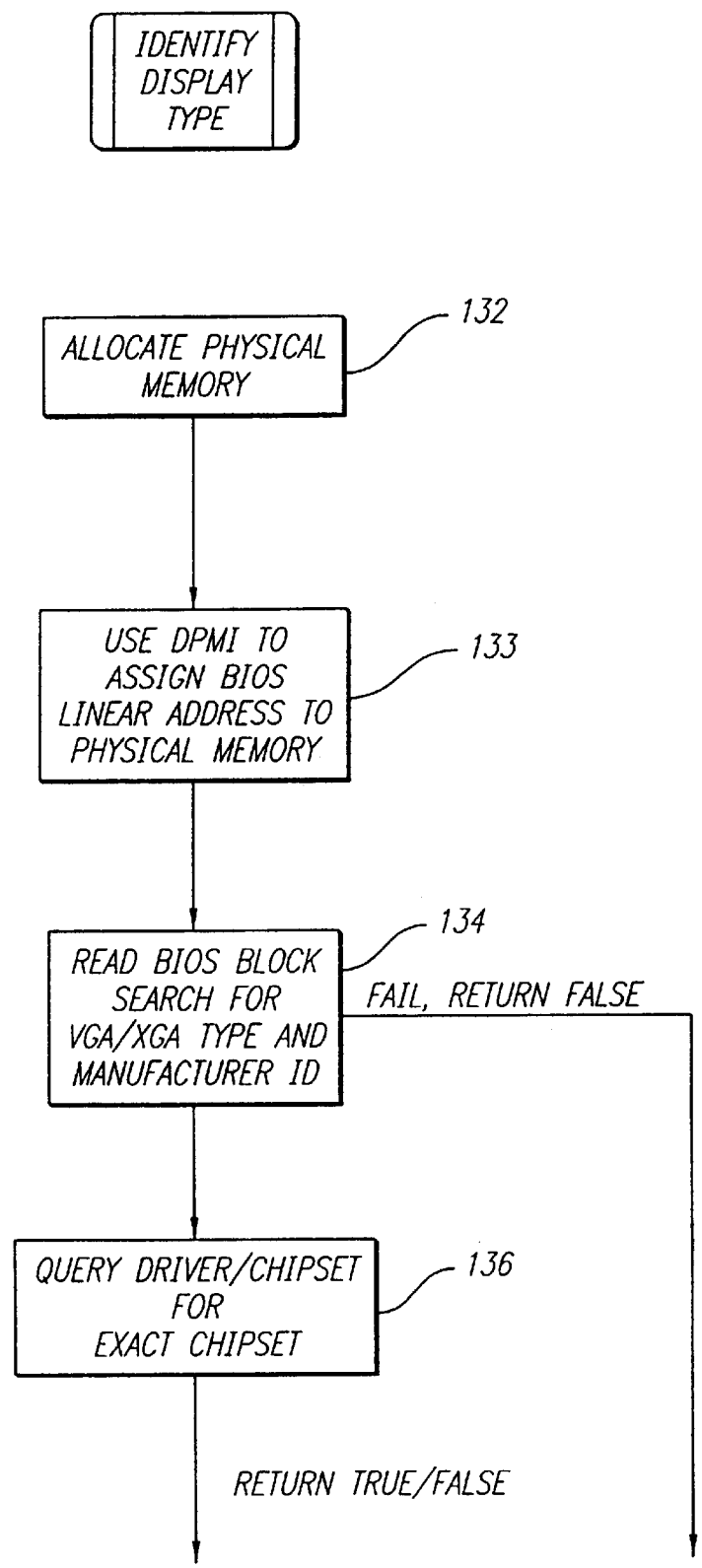

FIG. 7, which in turn incorporates by reference FIGS. 8–13, is a flow chart of an implementation of a preferred embodiment meeting the requirements described above. The environment of this implementation is a standard Microsoft Windows 95™ operating environment, using Microsoft Visual C and Microsoft MASM for the development platform. That is not to imply that this invention is limited in scope to that environment or platform. The invention could be implemented within any graphical interface environment, such as X-Windows, OSF Motif, Apple OS, and others in which similar video standards (VGA, SuperVGA, XGA, 8514/A) are practiced. The reference books PC Video Systems by Richard Wilton, published by Microsoft Press and Programmer's Guide to the EGA, VGA, and Super VGA Cards by Richard F. Ferraro, published by Addison Wesley provide more than adequate background information to implement this embodiment.

On initialization, step 102, the program determines the size and locations of any display modifications it will make. As described in FIG. 8, the application queries the BIOS, step 134, and the video chipset 66, step 136, for compatibility information. Physical memory is allocated, step 132, and accessed using Microsoft's DPMI (DOS Protected-Mode Interface) to map it to the linear memory address in which the BIOS resides. If the BIOS data does not include a standard VGA, SuperVGA, XGA, or 8514/A signature, step 134, this routine returns a failure. If the BIOS also contains a known chipset manufacturer's identification, the driver and/or chipset are queried with manufacturer-specific routines, step 136, to identify and initialize, as necessary, the specific chipset.

If, at step 104, the program was unable to access the BIOS data, or was unable to identify the display type, the user may be prompted at step 116 as to whether the program should continue to run in a standard window/toolbar. The program may either exit or proceed in "windowed-mode".

The program determines the screen borders to be accessed, step 106, based upon user preferences, and determines whether sufficient video memory exists to make the necessary display changes. For example, if the screen is currently set to a 1024×768 resolution at 16 bits-per-pixel, and the program is to include four graphical interface bars, one on each edge, with each bar 20 pixels deep, the program must check that video memory is greater than 1.7 MB (required number of bytes= PixelsWidth*BitsPerPixel*PixelsHeight).

Figure 5:
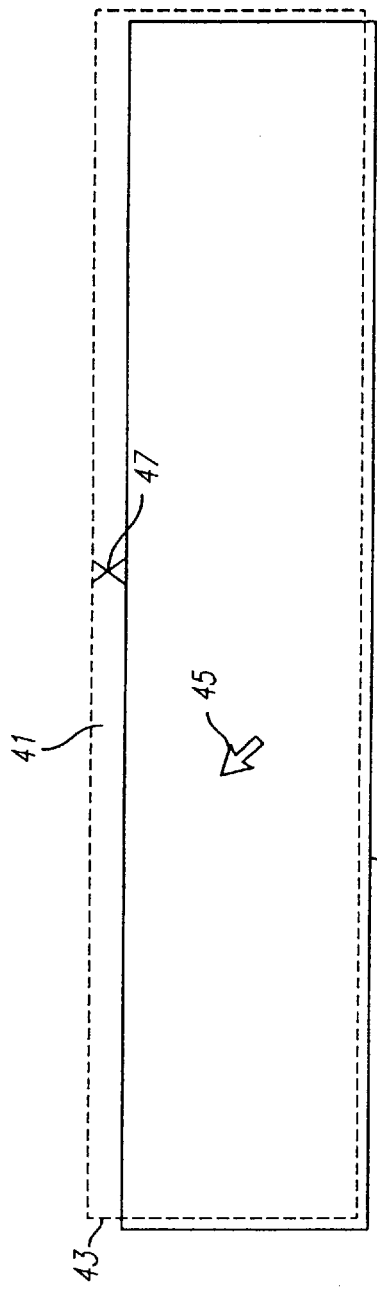
FIG. 5 shows a cursor or pointer within the overscan user interface and the hotspot above it within the standard display.

The CRT Controller Registers which contain the number which are illustrated in FIG. 5 are the key to phase 1 of this invention. The controller registers (CRs) may be accessed through standard input/output ports. The CRTC registers must first be first unlocked, step 108, to make them writeable. They are unlocked by clearing bit 7 in CR 11. Addressing of video memory, step 112, is accomplished through one of several means. One is to use the standard VGA 64 kb "hardware window", moving it along the video memory buffer 67 (FIG. 4)in 64 kb increments as necessary. The preferred method is to enable linear addressing by querying the video chipset for the linear window position address, step 138 of FIG. 11. This 32-bit offset in memory allows the program to map the linear memory to a physical address, steps 140 and 142 of FIG. 11, that can be manipulated programmatically.

Figure 9:
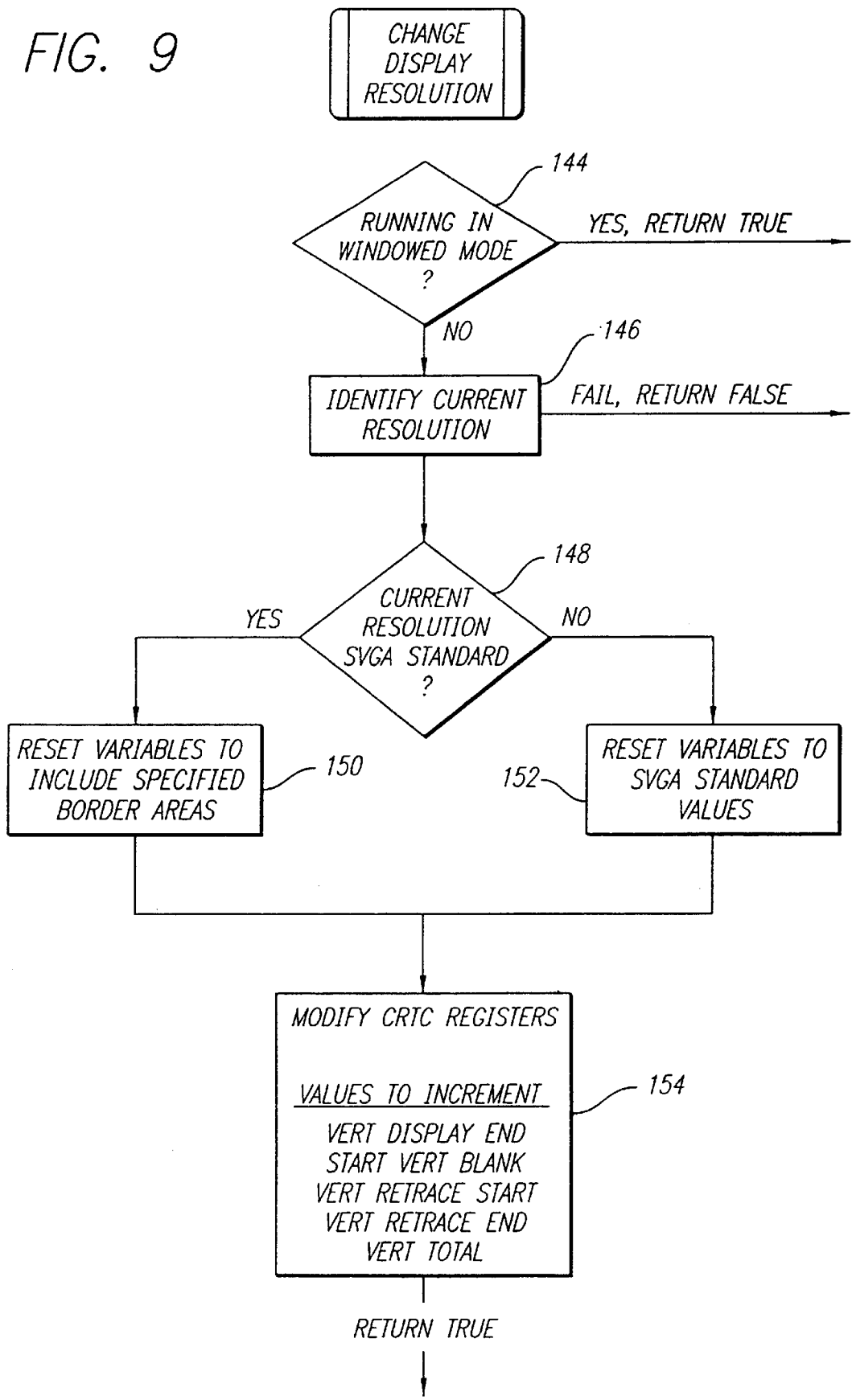
Figure 12:
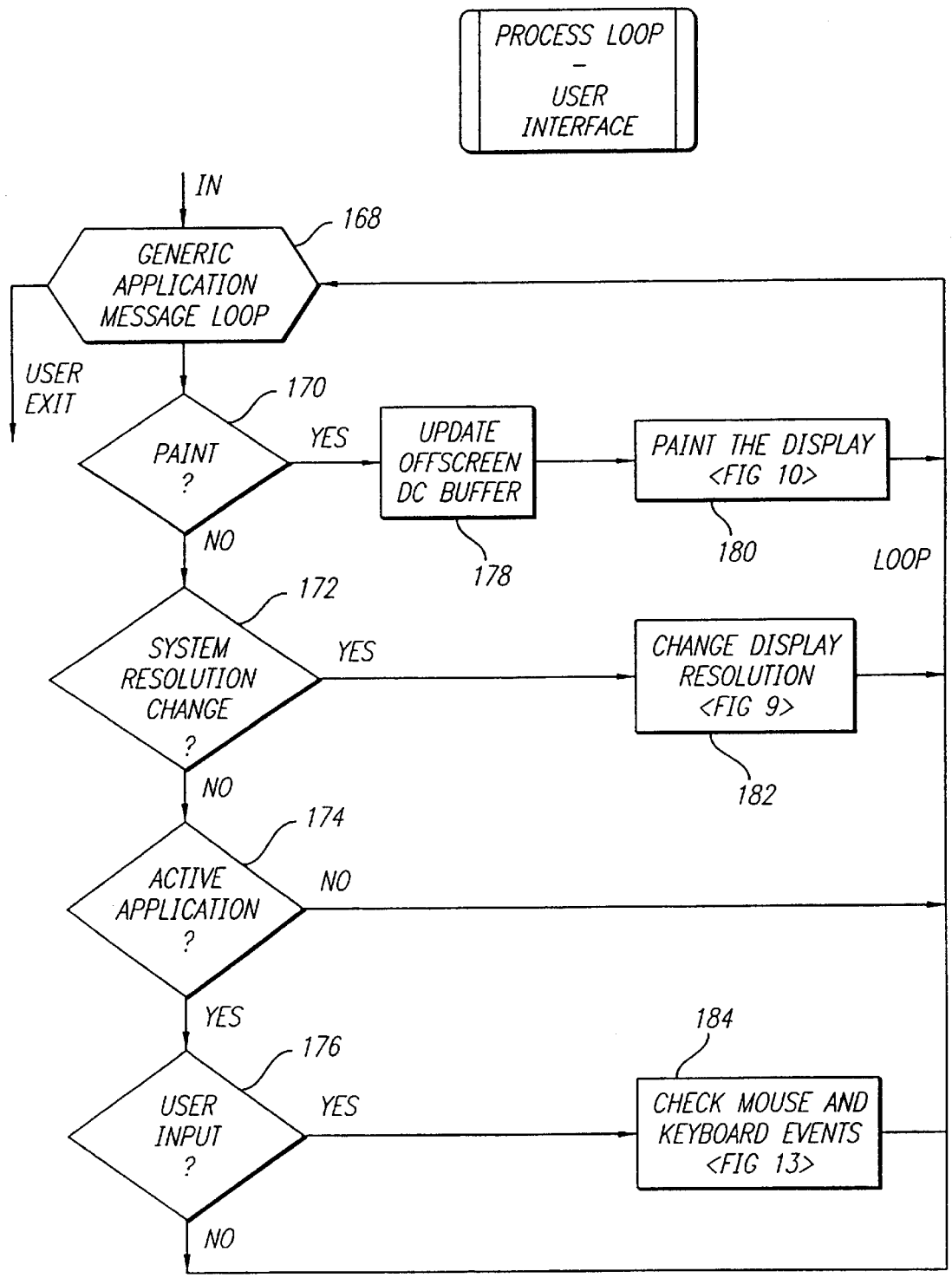

Having been successful to this point, the program can modify the display, step 114 and FIG. 9, to increment the border areas. This routine first checks whether the system is running in windowed mode, step 144, and, if so, returns true. If not, it then determines whether to reset all registers and values to their original state, effectively returning the display to its original appearance, step 152. The determination is based upon a number of parameters, such as whether the current resolution, step 146, reflects a standard value or previous programmatic manipulation, step 148. If a standard resolution is already set, the variables are reset to include the specified border areas, step 150. The CRTC registers are incremented, step 154, to modify the scanned and blanked areas of the display. If the top or side areas are modified, existing video memory is moved accordingly in subsequent step 162 of FIG. 10.

If any of the foregoing routines returns a failure, the program prompts the user for a preference as to whether "windowed-mode" should be used or the program should exit, step 116.

Phase 2 of the invention begins by painting the new images into a standard offscreen buffer, step 118, as is commonly used in the art, and making the contents visible, step 120, as described in FIG. 10. If the program is in "windowed-mode", step 156, the offscreen buffer is painted into the standard window client space, step 166, and made visible, step 164, using generic windowing-system routines. Otherwise, the linear window position address is mapped, step 158, as described in FIG. 11 which has been previously explained. Once the linear memory is mapped to a physical memory address, step 142, again using DPMI, the contents of the offscreen display buffer can be copied into the video buffer directly, step 154 of FIG. 10.

The preferred embodiment application includes a standard application message loop, step 122, which processes system and user events. An example of a minimum functionality process loop is in FIG. 12. Here the application handles a minimal set of system events, such as painting requests, step 170, system resolution changes, step 172, and activation/deactivation, step 174. Here, too, is where user events, such as key or mouse events, may be handled, step 184, detailed in FIG. 13. System paint messages are handled by painting as appropriate into the offscreen buffer, step 178, and painting the window or display buffer, step 180, as appropriate, as described earlier in FIG. 10. System resolution messages are received whenever the system or user changes the screen or color resolution. The programs reset all registers to the correct new values, then changes the display resolution, step 182, as earlier described in FIG. 9, to reflect the new resolution modified. User messages are ignored when the program is not the active application.

Figure 13:
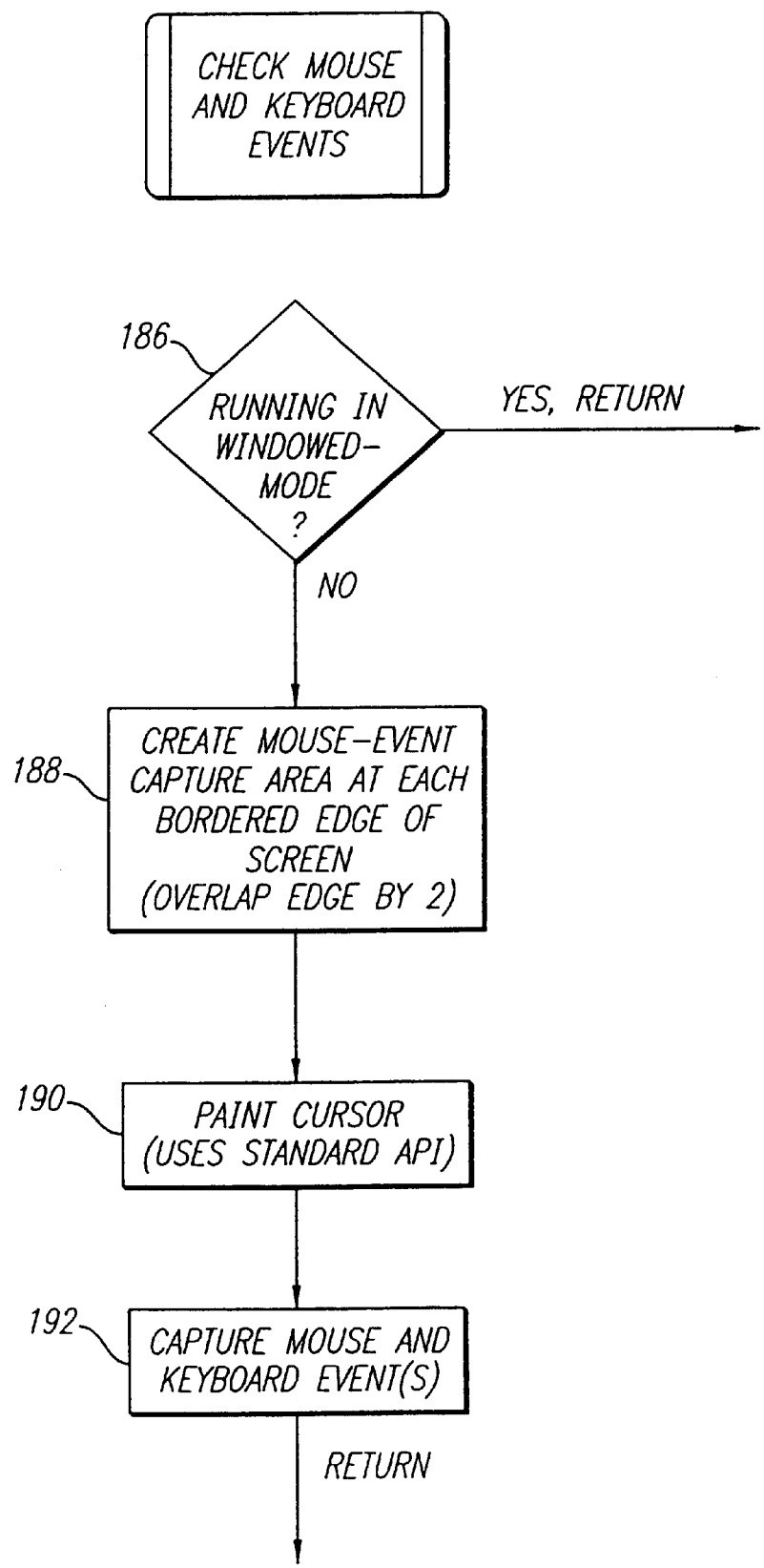

FIG. 13 describes a method of implementing user-input events. In this embodiment, the hardware cursor cannot be moved outside the original VGA/SuperVGA/XGA window resolution, although other embodiments may support such a feature. This means that that if the user's mouse runs beyond the display area, the tip of the pointer and the associated hotspot will remain at the edge most pixel of the diplay. As the overscan user interface is long and thin and wide enough for only one window or line of text in its width, only the lengthwise position of the pointer needs to be captured. In FIG. 13, the first step 186 checks whether the system is running in windowed mode and, if it is, returns with no action. If it is not, as shown in FIG. 5, a transparent window 41 is placed at each modified edge of the display, sufficiently large to include the area of the border interface 30, plus a two-pixel overlap 43 of the adjoining edge of the display area, step 188. When the pointer 45 is moved into one of these windows, the cursor is replaced with a special cursor where the image is two points below the defined "hotspot" 47. Therefore, whenever the pointer is within the two-pixel edge, the cursor is drawn, step 190, offset by two pixels in the appropriate direction to give the illusion that the pointer 45 is completely within the overscan area. The x or the y coordinate is offset by the necessary two pixels when handling click and position events. In this environment, user events are directed to a horizontal position within a window, not to a vertical position on one of the 20 lines within the window. Capturing user input events in the transparent windows, step 192, allows an interface to the bars in the overscan area simply by pointing to the specific edge area 43. The user events are attributed to the appropriate edge by the pointer position within one of the transparent windows.

FIG. 7 describes the cleanup mechanisms when the program is closed, step 124. The display is reset to the original resolution, step 126, and the CRTC registers are reset to their original values, step 128, and locked, step 130.

Alternative embodiments

1. Utilizing the VESA BIOS Extensions (VBE) in place of the CRT Controller registers (FIG. 5) to determine the linear window position address, step 138, as necessary.
2. Utilizing API's (application programming interfaces) 62 capable of direct driver and/or hardware manipulation, such as Microsoft's DirectX, in place of the CRT Controller registers and/or direct access to the display buffer.
3. Utilizing API's (application programming interfaces) 62, such as Microsoft's DirectX, capable of direct driver and/or hardware manipulation, to create a second virtual display surface on the primary display with the same purpose, to display a separate and unobscured graphical user interface.
4. Utilizing modifications in the video subsystem of the operating system 63 in place of the CRT Controller registers and/or direct access to the display buffer.
5. Utilizing modifications in the video subsystem of the operating system 63 to create a second virtual display surface on the primary display with the same purpose, to display a separate and unobscured graphical user interface.
6. Building this functionality into the actual video drivers 64 and/or mini-drivers. Microsoft Windows provides support for virtual device drivers, VxDs, which could also directly interface with the hardware and drivers. These could also include an API to provide applications with an interface to the modified display.
7. Incorporating the same functionality, with or without the VGA registers, into the BIOS and providing an API to allow applications an interface to the modified display.
8. Incorporating the same functionality into hardware devices, such as the monitor itself, with hardware and software interfaces to the cpu.

Other embodiments and variations of the invention will be apparent to one skilled in the art from a consideration of the specifications, drawings, and claims. It is intended that the scope of the invention be limited only by the scope of the following claims.

We claim:

1. A method for displaying an image on a video display system in an overscan area outside of a display area generated with a video mode having two dimensions, each dimension having a number of pixels, in a computer system running an operating system which presents a user interface fully occupying said display area, comprising:

a. adjusting parameters for said video display system to increase the number of pixels in a dimension of said video display system by a number of pixels less than or equal to a difference between the number of pixels specified in said video mode and a maximum number of pixels which said video display system can effectively display;

b. within said computer system, addressing video display memory for said increased pixels;

c. writing said image to said video display memory; and d. displaying said image from said video display memory onto said video display system along side said display area.

2. The method of claim 1 wherein the dimension of said video display system in which the number of pixels is increased is vertical and said video display system presents said image below said display area.

3. The method of claim 2 wherein said image includes a movable pointer which moves in relation to user input.

4. The method of claim 3 wherein said pointer has a tip which is positioned below a hot spot associated with said tip.

5. The method of claim 4 wherein said hotspot remains within said display area while said pointer is displayed within said image.

6. The method of claim 5 wherein said display area includes a transparent window adjoining said image such that events which occur while said hotspot is within said transparent window may be associated with said transparent window.

7. The method of claim 1 wherein said parameters are control parameters for a controller for a cathode ray tube display.

8. The method of claim 1 wherein said video mode is defined in one or both of the standard DOS ROM BIOS or the VESA extensions thereto.

9. The method of claim 1 wherein the dimension of said video display system in which the number of pixels is increased is horizontal and said video display system presents said image to the right of said display area.

10. The method of claim 9 wherein said image includes a movable pointer which moves in relation to user input and said pointer has a tip which is positioned to the right of a hot spot associated with said tip.

11. The method of claim 1 wherein the dimension of said video display system in which the number of pixels is increased are both horizontal and vertical and said video display system presents said image on a vertical side of said display area and on a horizontal side of said display area.

12. A device for displaying an image on a video display system in an overscan area outside of a display area generated with a video mode having two dimensions, each dimension having a number of pixels, in a computer system running an operating system which presents a user interface fully occupying said display area, comprising:

a. means for adjusting parameters for said video display system to increase the number of pixels in a dimension of said video display system by a number of pixels less than or equal to a difference between the number of pixels specified in said video mode and a maximum number of pixels which said video display system can effectively display;

b. means for, within said computer system, addressing video display memory for said increased pixels;

c. means for writing said image to said video display memory; and d. means for displaying said image from said video display memory onto said video display system along side said display area.

13. The device of claim 12 wherein the dimension of said video display system in which the number of pixels is increased is vertical and said video display system presents said image below said display area.

14. The device of claim 13 wherein said image includes a movable pointer which moves in relation to user input.

15. The device of claim 14 wherein said pointer has a tip which is positioned below a hot spot associated with said tip.

16. The device of claim 15 wherein said hotspot remains within said display area while said pointer is displayed within said image.

17. The device of claim 16 wherein said display area includes a transparent window adjoining said image such that events which occur while said hotspot is within said transparent window may be associated with said transparent window.

18. The device of claim 12 wherein said parameters are control parameters for a controller for a cathode ray tube display.

19. The device of claim 12 wherein said video mode is defined in one or both of the standard DOS ROM BIOS or the VESA extensions thereto.

20. The device of claim 12 wherein the dimension of said video display system in which the number of pixels is increased is horizontal and said video display system presents said image to the right of said display area.

21. The device of claim 20 wherein said image includes a movable pointer which moves in relation to user input and said pointer has a tip which is positioned to the right of a hot spot associated with said tip.

22. The device of claim 12 wherein the dimension of said video display system in which the number of pixels is increased are both horizontal and vertical and said video display system presents said image on a vertical side of said display area and on a horizontal side of said display area.

23. A computer program storage device containing a computer program which, when run on a computer system, accomplishes the following method for displaying an image on a video display system in an overscan area outside of a display area generated with a video mode having two dimensions, each dimension having a number of pixels, in a computer system running an operating system which presents a user interface fully occupying said display area:

a. adjusting parameters for said video display system to increase the number of pixels in a dimension of said video display system by a number of pixels less than or equal to a difference between the number of pixels specified in said video mode and a maximum number of pixels which said video display system can effectively display;

b. within said computer system, addressing video display memory for said increased pixels;

c. writing said image to said video display memory; and d. displaying said image from said video display memory onto said video display system along side said display area.

24. The computer program storage device of claim 23 wherein the dimension of said video display system in which the number of pixels is increased is vertical and said video display system presents said image below said display area.

25. The computer program storage device of claim 24 wherein said image includes a movable pointer which moves in relation to user input.

26. The computer program storage device of claim 25 wherein said pointer has a tip which is positioned below a hot spot associated with said tip.

27. The computer program storage device of claim 26 wherein said hotspot remains within said display area while said pointer is displayed within said image.

28. The computer program storage device of claim 27 wherein said display area includes a transparent window adjoining said image such that events which occur while said hotspot is within said transparent window may be associated with said transparent window.

29. The computer program storage device of claim 23 wherein said parameters are control parameters for a controller for a cathode ray tube display.

30. The computer program storage device of claim 23 wherein said video mode is defined in one or both of the standard DOS ROM BIOS or the VESA extensions thereto.

31. The computer program storage device of claim 23 wherein the dimension of said video display system in which the number of pixels is increased is horizontal and said video display system presents said image to the right of said display area.

32. The computer program storage device of claim 31 wherein said image includes a movable pointer which moves in relation to user input and said pointer has a tip which is positioned to the right of a hot spot associated with said tip.

33. The computer program storage device of claim 23 wherein the dimension of said video display system in which the number of pixels is increased are both horizontal and vertical and said video display system presents said image on a vertical side of said display area and on a horizontal side of said display area.

* * * * *

UNITED STATES PATENT AND TRADEMARK OFFICE
CERTIFICATE OF CORRECTION

PATENT NO : 6,018,332
DATED : Jan. 25, 2000
INVENTOR(S) : D. David Nason, Thomas C. O'Rourke, and J. Scott Campbell It is certified that error appears in the above-identified patent and that said Letters Patent are hereby corrected as shown below:

Claim 1, column 9, line 4, "addressing video display" should read --addressing a video display--.
Claim 11, column 9, line 40, "the dimension of" should read --the dimensions of--.
Claim 11, column 9, line 41, "pixels is increased" should read --pixels are increased--.
Claim 12, column 9, line 58, "addressing video display" should read --addressing a video display--.
Claim 22, column 10, line 28, "the dimension of" should read --the dimensions of--.
Claim 22, column 10, line 29, "pixels is increased" should read --pixels are increased--.
Claim 23, column 10, line 48, "addressing video display" should read --addressing a video display--.
Claim 33, column 12, line 8, "the dimension of" should read --the dimensions of--.
Claim 33, column 12, line 9, "pixels is increased" should read --pixels are increased--.

Signed and Sealed this

Fifteenth Day of May, 2001

*Attest:*

NICHOLAS P. GODICI

*Attesting Officer*  *Acting Director of the United States Patent and Trademark Office*